Aug. 17, 1948.   A. G. B. METCALF   2,447,024
APPARATUS FOR PHOTOELECTRIC MEASUREMENT OF AREAS
Original Filed Oct. 31, 1939   4 Sheets-Sheet 1

Inventor
Arthur G.B. Metcalf
by his Atty.

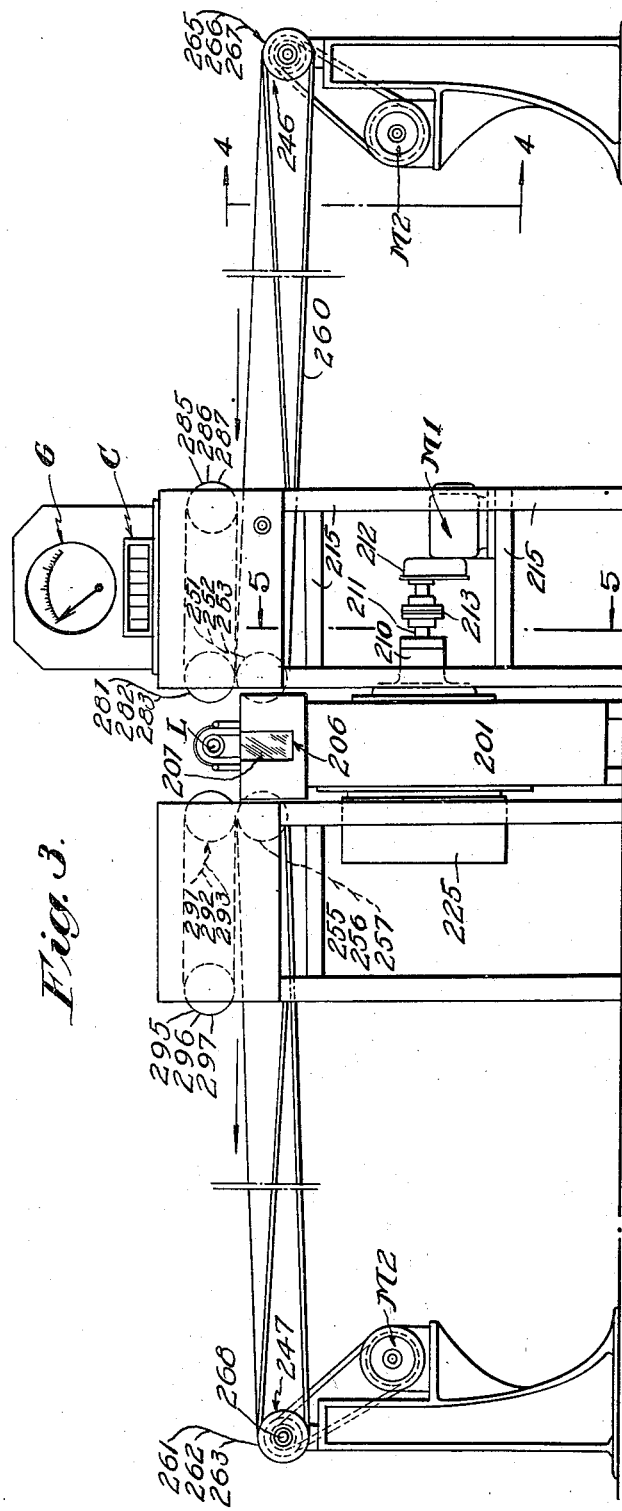
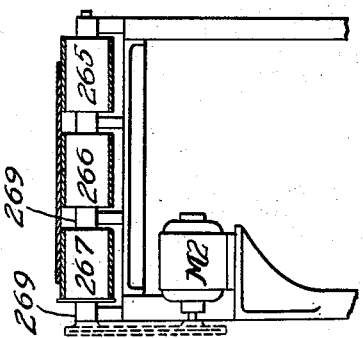

Aug. 17, 1948.  A. G. B. METCALF  2,447,024
APPARATUS FOR PHOTOELECTRIC MEASUREMENT OF AREAS
Original Filed Oct. 31, 1939                    4 Sheets-Sheet 3
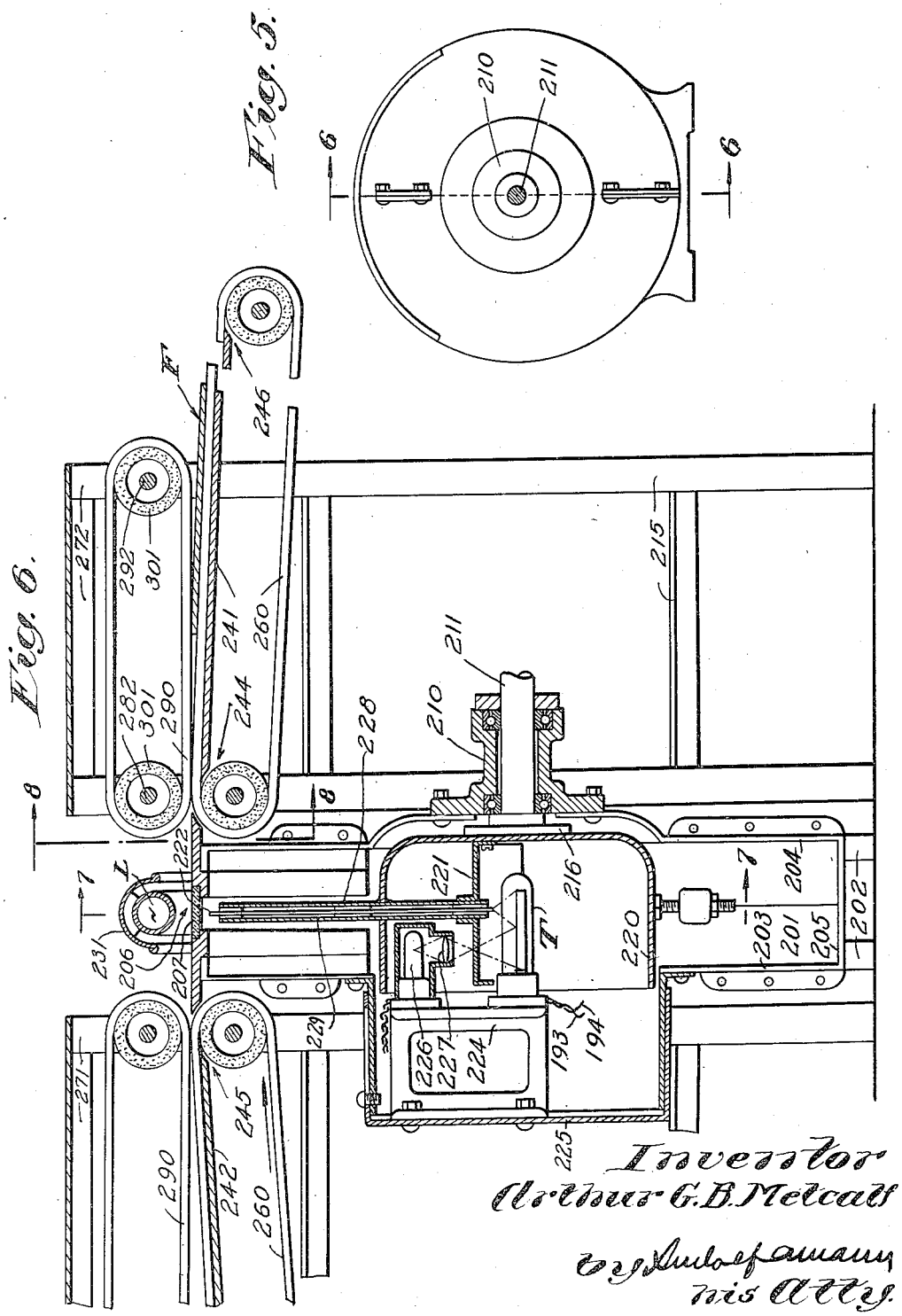
Inventor
Arthur G. B. Metcalf Aug. 17, 1948.  A. G. B. METCALF  2,447,024
APPARATUS FOR PHOTOELECTRIC MEASUREMENT OF AREAS
Original Filed Oct. 31, 1939  4 Sheets-Sheet 4
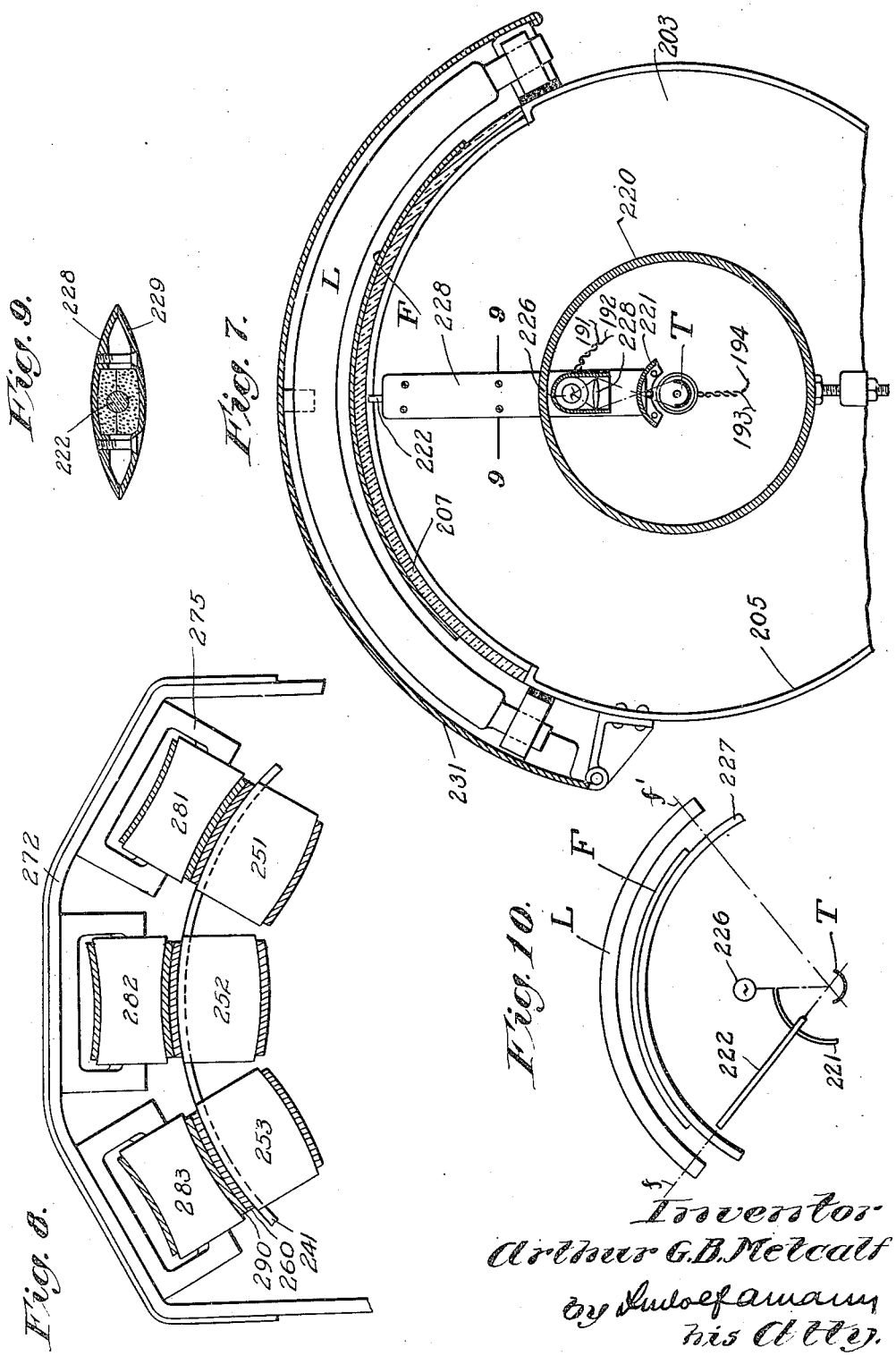
Inventor
Arthur G. B. Metcalf
by [signature]
his Atty.

Patented Aug. 17, 1948

2,447,024

UNITED STATES PATENT OFFICE 2,447,024

APPARATUS FOR PHOTOELECTRIC MEASUREMENT OF AREAS

Arthur G. B. Metcalf, Milton, Mass., assignor to North American Research Corporation, Cambridge, Mass., a corporation of Massachusetts Original application October 31, 1939, Serial No. 302,185. Divided and this application January 19, 1944, Serial No. 518,841

6 Claims. (Cl. 88—14)

This present invention relates to the integration of functions, as for example the measuring of areas, by effecting a control or a reading proportionate to a dimension or the sum of dimensions of a surface, the present application being a division of Patent No. 2,360,883.

It has heretofore been proposed to measure the area of a surface by measuring the average illumination of a known area, with the unknown area, of different light affecting properties, superimposed thereon. It has also been proposed to subdivide an area into component portions, or strips, of known areas including unknown areas, the average reflection or transmission values of the component portions being measured in terms of average light intensity whereupon the average intensity values for the respective portions are summated to obtain the total area to be found. Integration of this type depends in principle upon the degree of constancy of the properties of light sources, photoelectric cells, light transmitting media and all electric circuit components used in carrying out the measurement. However, all extant devices of this type are not constant in this respect and vary considerably with time or other factors. Since the areas ultimately indicated are inseparably correlated to these normal variations, it is impossible to determine what part of a total integration corresponds correctly to the area to be measured and what part is due to fluctuation of the electric or illumination values. Therefore, the area indicated may or may not conform to the actual value to be measured.

It is the principal object of the present invention to provide a means for scanning an area so as to measure the area or to integrate functions generally by summating values proportionate to a path or paths traversing an article defining a function. This object is preferably attained with the aid of photoelectric means, in a manner inherently independent of variations of the light affecting properties of surfaces defining the area to be measured, of intensity variations of light sources and sensitivity changes of photo tubes, and free from the effects of changes in electrical devices due to age, fluctuations in supply voltage and other factors. Further objects are to provide an integrator, as for example a hide measuring machine which works exactly and rapidly, without inherent mechanical, optical or electrical sources of errors, which is adapted for continuous feeding of objects, for example, hides, to the integrating station the speed of feed being synchronized with the scanning speed so as to maintain the width of the scanned paths substantially constant, which is adaptable to industrial operating conditions, whose accuracy can be increased by simple expedients to any desired practical degree and which indicates a measured area exactly, without time delay and independently of gradual wear, and speed of operation.

In one of its aspects, the invention proposes to integrate a function by summating paths or traces of varying values, corresponding to the periods during which a scanning element passes a surface element effecting a contrasting light intensity change which itself may vary over a considerable range without introducing errors into the integrating operation. Further, the invention may employ as a particularly practical feature scanning devices with light conductors, arrangements for quickly, reliably and conveniently controlling the movement of material to be measured, means for continuously feeding objects to be measured to the integrating station, and means for synchronizing the speed of feed and the scanning speed with the speed of summation of the integrating means.

These and other objects, aspects and features of the invention will be apparent from the following description of various embodiments explaining its genus by way of example and referring to the drawings, in which:

Fig. 3 is a front elevation of a practical embodiment of the invention, incorporating an object conveyer;

Fig. 4 is a section on lines 4—4 of Fig. 3;

Fig. 5 is a section on lines 5—5 of Fig. 3;

Fig. 6 is a section on lines 6—6 of Fig. 5;

Fig. 7 is a section on lines 7—7 of Figure 6;

Fig. 8 is a section on lines 8—8 of Fig. 6;

Fig. 9 is a section on lines 9—9 of Fig. 7; and

Fig. 10 is a diagram illustrating the operation of scanning equipment according to Fig. 7.

Figure 1:
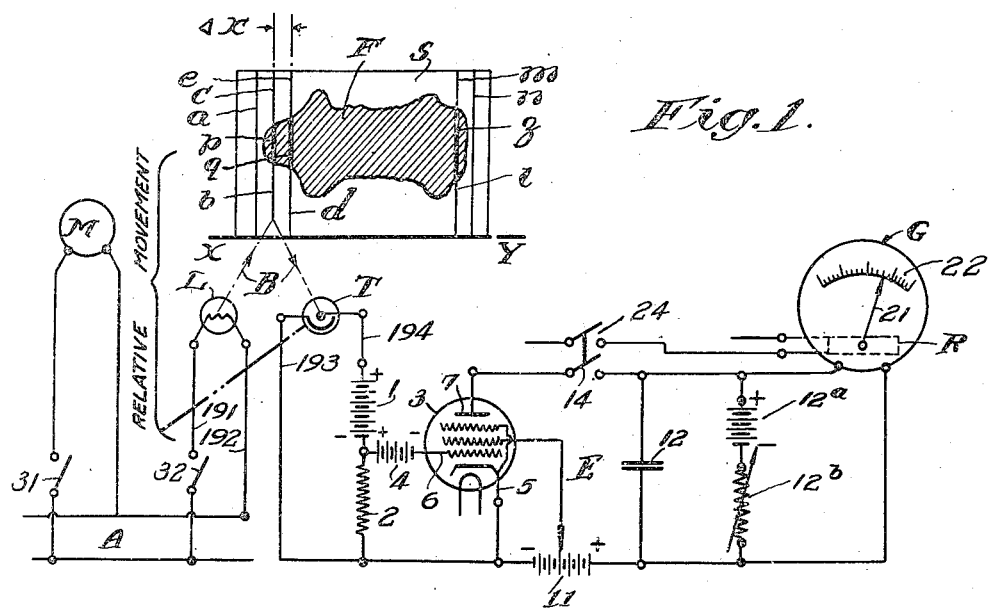
Fig. 1 is a diagram of the integration according to the invention, and of apparatus suitable for carrying it out.
Figure 2:
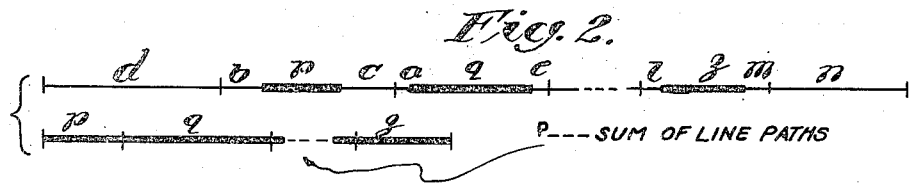
Fig. 2 is a diagram illustrating the integrating operation according to the invention.

With reference to Figs. 1 and 2, integration according to the invention will first be described without regard to specific mechanism for carrying it out. In Fig. 1 an irregular surface F may represent a function to be integrated, for example a hide whose area is to be measured. This area to be measured is in fixed relation applied to a standard area S, areas F and S having different light affecting properties, respectively; for example, F may be opaque and S transparent, or they may reflect at different intensities, light incident thereon.

A light source L directs, by suitable means, a light beam B towards areas F, S, which transmit, or reflect it towards photoelectric tube T.

A motor M of constant speed, or with a known speed characteristic, for example supplied with current from line A, provides relative movement between surface S and beam B in such a manner that the beam traces a number of line paths across areas F, S, defining the areas by way of these traces, as for example $a; b, p, c; d, q, e; \ldots l, z, m; n$; indicated in Fig. 1.

Phototube T controls an electric integrating circuit E for example of the following type. Across the terminals of the photoelectric tube T are connected in series a direct current source 1, for example a battery supplying 90 volts, and a resistance 2 of about 10 megohms. An electron discharge tube 3, preferably of the type having a plate current which is practically constant for widely varying plate voltages (for example, R. C. A.-58) has a cathode 5 connected to the phototube cathode and one terminal of resistance 2, and a control grid 6 connected to a point between resistor 2 and the negative terminal of battery 1, through biasing battery 4 of about −20 volts. The output circuit includes an anode battery 11 of about 500 volts, a condenser 12 of about 40 mf., a balancing circuit with battery 12a of about 10 volts and a resistance 12b of about 10,000 ohms for compensating for normal current flow and condenser leakage, and a switch 14 between condenser 12 and plate 7 of tube 3. A metering device G is connected across condenser 12, which device may consist of an electrostatic voltmeter of conventional design, with an indicator 21 playing over a suitably calibrated scale 22. A resetting device indicated at R is preferably provided permitting movement of hand 21 in one direction, but returning it into initial position upon energization of the resetting element by means of switch 24. Switches 31 and 32 may be provided for motor and lamp circuits respectively; resetting switch 24 and plate circuit switch 14 may be interconnected as indicated in Fig. 1.

With a device of this general type, integration according to the invention is carried out as follows:

Assuming for example that area S with area F superimposed thereon is the surface of a cylinder, slit along generatrix X—Y of Fig. 1 and developed, assuming that the light ray B is directed to trace a helical line path $a-b-p-c-\ldots-n$ over areas S and F, and further assuming that beam B is reflected from S (that is, on trace components $a, b, c, \ldots l, m, n$) at a higher intensity than from F (on components $p, q, \ldots A$), the phototube T will consecutively receive light of intensities varied as indicated in Fig. 2, where the paths $a, b, \ldots n$ of Fig. 1 are indicated in thin lines and, in thicker lines, paths $p, q \ldots z$ over which the photocell will receive less intense light as compared to the intensity of the beam when its line trace traverses area S.

During periods when light of comparatively high intensity strikes phototube T, its cathode emits and current will flow in circuit 1—2—T—1. The potential drop across resistor 2 will be about 30 volts or more, of the polarity indicated in Fig. 1. This drop added to the biasing potential of battery 4 brings the control electrode potential to about −50 volts or more, referred to the cathode. Because of this blocking potential, the tube does not conduct. Variations of the control voltage within a wide range, for example from −40 to −70 volts are immaterial, potentials within that range being sufficient to bias the tube beyond the cut off point. Hence, the output circuit will be deenergized and metering device G at a standstill.

As soon as the illumination of phototube T is decreased below a certain value, its impedance increases correspondingly and practically no current flows through resistor 2, so that the biasing potential of −20 volts prevails at grid 6. At this control potential, tube 3 will begin to become effective in passing a current of about 1 milliampere into its output circuit, independently of the plate voltage. This current charges condenser 12, so long as the light intensity received by the phototube is below a predetermined value, that is, so long as beam B traverses area F in paths $p, q, \ldots z$. Condenser 12 is provided as an energy reservoir because of the inertia of the electrostatic voltmeter. It should be kept in mind that, so long as phototube T conditions grid 6 to permit electron flow in tube 3, condenser 12 and voltmeter G are supplied with a charge which is a linear function of time, although the plate voltage is constantly decreasing. This is due to the above-mentioned fact that the plate current of tubes of this type is independent of plate voltage over a wide range.

It will be evident that the integrating circuit may be provided with suitable amplification devices, if it should be desirable to have more energy available for actuating the indicating device G.

Since it was assumed (referring to Figs. 1 and 2) that the intensity of beam B is decreased while passing area F, and since circuit E can be set in such a manner that grid 6 blocks electron flow as soon as beam B passes from area F to area S and initiates electron flow upon the beam passing from area S to F, the indicator of voltmeter G will move certain distances proportionate to paths $p, q, \ldots z$ across area F, and the reading at scale 22 will be linearly related to the sum of these paths covering area F, as indicated in Fig. 2. Since the distance $(\Delta x)$ of linear paths $p, q, \ldots z$ can be exactly fixed, and since, obviously, an elementary area $(\Delta A) = y(\Delta x)$, if $y$ is the length of a linear path element, the entire area to be measured will be $P(\Delta x)$ if P is the sum of all path elements within that area. The reading of meter G is proportionate to this value P and hence to the area to be measured, the various constants introduced during the translation of the scanning paths into the meter reading being of course taken care of by appropriately calibrating the meter.

It will be evident that $(\Delta x)$, conforming to the spacing of the scanning paths, will preferably be constant, but it is understood that it may be desirable to make $(\Delta x)$ the function of a variable, for example the scanning path. In that case also, the meter can be calibrated, or other means provided to furnish readings correctly indicating the measured area. By suitably selecting the value of $(\Delta x)$, any degree of integration accuracy can be obtained.

It will also be evident that the relative motion of beam B and surface S is preferably at constant speed, in order to obtain linear meter scale; however, if for some reason the speed of motor M varies according to a known function, the integrations will remain correct if the meter scale is correspondingly calibrated, or the meter speed is compensated in accordance with the motor speed function. A way of providing inherent compensation for such speed variation will be described with reference to a specific embodiment of the integrating circuit.

A practical embodiment of the invention will now be described with reference to Figs. 3 to 10. In this embodiment, both scanning element and surface to be measured are moving.

In Figs. 3, 6 and 7, 201 is a scanner housing supported on legs 202 and having circular, vertically split end walls 203, 204 and curved side walls 205. The latter have a narrow window 206 covered with a suitable curved transparent plate 207. A bearing 210 attached to one end wall of housing 201 supports shaft 211 driven through gear box 212 and coupling 213 from synchronous motor M1 mounted on table frame 215 (Fig. 3). Attached to flange 216 of shaft 211 is scanner head 220 with baffle 221. Mounted in head 220 and baffle 221 is a scanning rod 222, a light conducting rod preferably of very small diameter, reaching from window plate 207 to phototube T mounted on a bracket 224 on a tubular slide cover 225, of housing 201. A shielded lamp 226 with lens system 227 is likewise mounted within housing 201, extending into the space between the wall of scanner head 220 and baffle 221. The scanner rod 222 may be mounted between two sheath halves 228, 229 forming a rigid low air resistance housing, as indicated in Fig. 9.

A curved light source, for example tubular incandescent lamp L, is mounted in housing 231 opposite window 206, covering the maximum arc filled by surface F to be measured. As indicated in Fig. 10, baffle 221 covers an arc which is only long enough to prevent exposure of phototube T to lamp 226 during the passing of scanning rod 222 from a line $f$ between the outermost edge of an area F and the effective end of lamp L to a corresponding line $f^1$ on the opposite side of the scanning window, assuming that window 206 extends beyond the lamp ends. In this manner, the illuminated surface S (compare Fig. 1) is effectively extended around the entire scanner housing. The overlap in illumination of the phototube by rod 222 and auxiliary light source 226, respectively, provides for continuous scanning of area S with the higher light intensity, appropriate with this embodiment of the invention. The lens system 227 focuses a beam of light at the circumference of baffle 221 as indicated in Fig. 7, so that control of the phototube is transferred from the scanning rod to the auxiliary light source at a definite line, and any possibility is avoided of light from the auxiliary source falling on the phototube during the scanning operation as the rod passes by the skin when lamp L is obscured by opaque surface F. Lamp 226 and lens system 227 are preferably so designed that the light flux which they direct to the cathode of the phototube has about the same value as that due to the flux coming from lamp L through light conductor 222.

In order to move articles whose areas are to be measured, for example hides, over scanning window 206, conveyor tables 241, 242 (Figs. 3, 4, 6, 8) are provided on either side of scanner housing 201. The inner edges 244, 245 of these tables follow the curvature of housing 201, whereas the outer edges 246, 247 are straight. Below these edges are mounted three conveyor rolls for each edge, the inner rolls 251, 252, 253 and 255, 256, 257 being crowned to follow the contour of the scanner housing, and the outer rolls 261, 262, 263 and 265, 266, 267 being straight. Belts 260 are stretched over respective pairs of rolls, as indicated in Figs. 3 and 6. The outer rolls 261—263 and 265—267 are driven synchronously with scanner 222, for example by means of belts from motor or motors M2, shafts 268 for the outer rolls running in suitable bearings 269 (Fig. 4).

As shown in Figs. 6 and 8, two bridges 271, 272, mounted on table frames 215 are arranged above the inner, curved table edges; these bridges support in suitable bearings 275 guide rolls 281—283, 285—287 and 291—293, 295—297 carrying belts 290. The inner guide rolls are concave corresponding to the inner table rolls, whereas the outer guide rolls may be straight. As shown in Fig. 6, the guide rolls may be covered with sponge rubber cushions 301, and the outer guide rolls are somewhat lifted to form a wedge-shaped gap for gripping the sheet material advancing on the feeding table, for example the table on the right-hand side of Fig. 3, towards the scanning window.

In Figs. 6 and 7, wires 191, 192 and 193, 194 of lamp L and phototube T, respectively, are indicated which lead to a circuit, for example corresponding to that shown in Fig. 1. The measuring indicator G is preferably provided in front of the feeding station as indicated in Fig. 3, which also indicates protective covers for the conveyors, and a counter C.

In operating this device, the sheets to be measured, as for example hides, are laid on the moving carrier belts of the feeding table 241 which convey them towards the scanning window above which they are securely gripped by companion belts 290. The corresponding belts of discharge table 242 convey the hides from the scanner, and they can be conveniently removed from this discharge table. With motors M1 and M2 running in synchronism (a gear link from a single power source may of course be provided for that purpose), the speeds of hide F and of scanner 222 are exactly correlated so that indicator G can be linearly calibrated.

During the periods when arm 222 moves over surface F, for example a hide, light from lamp L is excluded from phototube T; at all other times, light from L or 226 will reach tube T and stop the indicator from moving. It will now be evident that the first-mentioned periods corresponding to paths $p, q, \ldots z$ of Figs. 1 and 2 and that the integration will proceed as described with reference to these figures.

It should be understood that the present disclosure is for the purpose of illustration only and that this invention includes all modifications and equivalents which fall within the scope of the appended claims.

I claim:

1. Apparatus of the type described comprising a cylindrical scanner housing, a circumferential window in said housing, scanning means rotating about the axis of, and arranged to traverse said window, and adjacent to said housing a conveyor table including conveyor belts adapted to convey the article to be scanned past said window and forming a conveyor surface having next to said housing substantially the curvature of the window.

2. Integrating apparatus of the type wherein a surface area to be measured is scanned by a light beam whose intensity variations are detected by a photoelectric circuit, comprising a light transmitting cylindrically curved supporting surface adapted to receive said surface area, a light source extended circumferentially along convex side of said surface, a substantially concentrated photoelectric element substantially in the axis of curvature of said surface, optical means adapted to conduct light from said source to said photoelectric element, and a carrier rotatable about said axis and adapted to move the receiving side of said optical means alongside said surface, and means for excluding from said photoelectric element all light other than that transmitted by said optical means.

3. Integrating apparatus of the type wherein a surface area to be measured is scanned by a light beam whose intensity variations are detected by a photoelectric circuit, comprising a substantially cylindrical housing, a light transmitting cylindrically curved supporting surface adapted to receive said surface area and forming a window in said housing, a light source extended circumferentially along the convex side of said surface, a substantially concentrated photoelectric element mounted on said housing substantially in the axis of curvature of said surface, optical means adapted to conduct light from said source to said photoelectric element, and a carrier rotatable around said axis and adapted to move the receiving side of said optical means alongside said surface, and means for excluding from said photoelectric element all light other than that transmitted by said optical means.

4. Integrating apparatus of the type wherein a surface area to be measured is scanned by a light beam whose intensity changes are detected by a photoelectric circuit, comprising a substantially opaque housing of circular cross section, a curved light transmitting supporting surface adapted to receive said surface area and forming a window in said housing, a light source on one side of said supporting surface, a photoelectric element within said housing, scanning means arranged for rotation substantially about the center line of said housing and adapted to conduct a beam of the light which may be transmitted from said housing to said photoelectric element, a light source within said housing arranged for illuminating said photoelectric element, and shielding means associated with said scanning means and adapted to absorb said beam while said scanning means passes said supporting surface.

5. Measuring apparatus of the type described comprising: a cylindrical scanning housing having a circumferential slot; a photoelectric tube mounted in said housing; a light source illuminating the entire area of said slot; a scanner unit mounted in said housing for rotation about the axis of said slot, and including means for transmitting to said tube a beam of light coming through said slot from said source; means for forming a sheet to be measured into a shape conforming to that of said housing; means for conveying said sheet across said slot in the direction of the housing axis so as to interrupt said beam; means operative when said scanning means is passing over said slot for excluding from said tube all light except that transmitted by said scanning means; and means for synchronously driving said unit and said conveying means, thereby maintaining a substantially constant relationship between their speeds.

6. Apparatus for measuring the area of a substantially opaque sheet comprising: a light source; a photoelectric element; supporting means, disposed between said source and said element, having a transparent portion on which said sheet is supported, and an opaque portion; movable optical means for conducting, toward said element, light which passes from said source through said transparent portion; means for moving said optical means so as to traverse alternately in paths traversing said sheet, said transparent and said opaque portions; and means for illuminating said element while said optical means is traversing said opaque portion, so that said element is illuminated at all times except when said optical means is traversing said sheet.

ARTHUR G. B. METCALF.

REFERENCES CITED

The following references are of record in the file of this patent:

UNITED STATES PATENTS

| Number | Name | Date |
| --- | --- | --- |
| 1,925,814 | Nicolson | Sept. 5, 1933 |
| 2,184,157 | Jones | Dec. 19, 1939 |
| 2,360,883 | Metcalf | Oct. 24, 1944 |

FOREIGN PATENTS

| Number | Country | Date |
| --- | --- | --- |
| 601,843 | Germany | Aug. 25, 1934 |